G. C. SCHOENBORN.
TOOL HOLDER.
APPLICATION FILED APR. 23, 1919.
1,341,934.
Patented June 1, 1920.
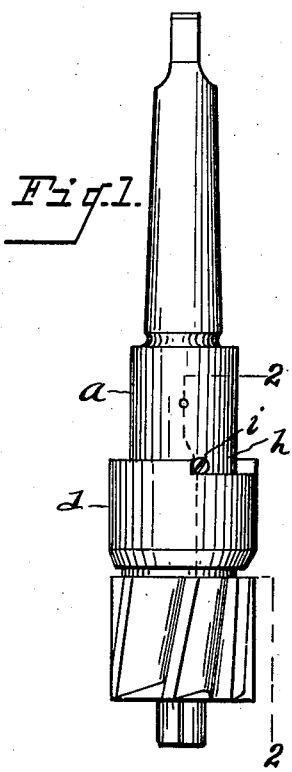
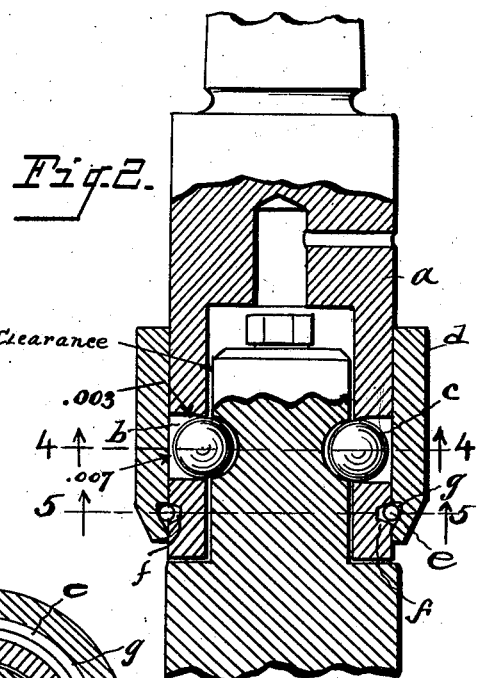
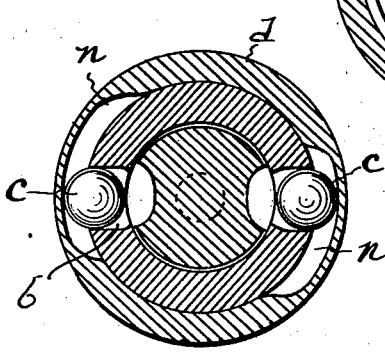
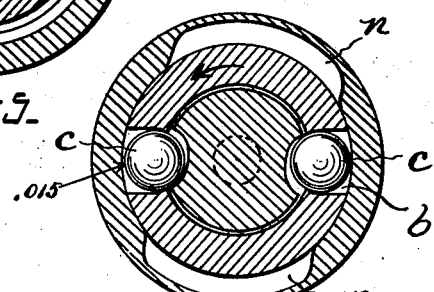
INVENTOR
Gustav C. Schoenborn
by Stuart L. Barnes
ATTORNEY.

UNITED STATES PATENT OFFICE.

GUSTAV C. SCHOENBORN, OF DETROIT, MICHIGAN, ASSIGNOR, BY MESNE ASSIGNMENTS, TO MANUFACTURERS MACHINE PRODUCTS CO., OF DETROIT, MICHIGAN, A CORPORATION OF MICHIGAN.

TOOL-HOLDER.

1,341,934.   Specification of Letters Patent.   Patented June 1, 1920.

Application filed April 23, 1919. Serial No. 292,202.

*To all whom it may concern:*

Be it known that I, GUSTAV C. SCHOENBORN, a citizen of the United States, residing at Detroit, in the county of Wayne and State of Michigan, have invented certain new and useful Improvements in Tool-Holders, of which the following is a specification.

This invention relates to a tool holder or chuck and is more especially adapted as a tool holder for counterbores.

In a counterbore the tool holder is not always lined up absolutely true with the hole which is counterbored and which acts as a guide for the pilot of the counterbore. It is quite advantageous to have a holder that will allow the counterbore to float within certain small limits to accommodate itself to any such irregularity of alinement. I achieve this floating capacity for the tool shank by utilizing a pair of balls upon which the shank may pivot and which also have enough clearance in their sockets to allow the shank to rock on them on an axis perpendicular to the axis that is common to both balls.

It is also desirable to have a tool holder which can be quickly operated to release or secure the tool in place. It is especially desirable to have one that does not require the tool itself to be grasped and turned for it is liable to cut the hands. I utilize a partially rotatable sleeve for projecting and releasing the balls that establish the driving relation between the shank and the holder. This in itself is not broadly new but I employ an arrangement for resisting the accidental turning of the sleeve, which is believed to be novel and which also serves to hold the sleeve assembled upon the holder in what is thought to be a novel way.

In the drawings,—

Figure 1 is a side elevation of a tool holder provided with a counterbore.

Fig. 2 is a fragmentary vertical section on the line 2—2 of Fig. 1, showing the balls when the driving effort is not applied.

Fig. 3 is a section on the line 4—4 of Fig. 2, but with the balls released.

Fig. 4 is a similar section showing the sleeve adjusted to fasten the tool shank into the holder, and the driving effort applied.

Fig. 5 is a cross section on the line 5—5 of Fig. 2.

The tool holder comprises an open ended barrel *a* which is provided with a pair of diametrically opposed perforations or ball sockets *b*. These perforations are of reduced diameter at the inner openings into the interior of the barrel to retain the balls from projecting out beyond their center lines. The greater portion of the perforation is of slightly greater diameter than the balls, preferably some 3/1000ths of an inch. The shank of the counterbore is provided with a pair of diametrically opposite recesses, a cross section of which, longitudinally of the shank, is substantially the same as something less than one-half of the ball *c*, but a cross section taken at right angles to the axis of the shank presents the section of the recess slightly elongated, as is shown in Fig. 3, that is to say, the recess is cut out by the cutter that is substantially the shape and size of a part of the ball but the tool shank is turned slightly on its axis while undergoing this operation, which gives the elongated effect shown in Fig. 3. This gives a slight lost motion between the holder and the shank, for convenience in assembly.

In Fig. 4 the driving relation of the ball, sleeve, shank and holding barrel is shown. By reason of the elongated recesses in the shank to give the lost motion driving connection, there will be some space between the rear side of the ball and the rear side of the recess (considering the front and rear as of the direction the parts are being driven). In Fig. 2 the clearance is clearly indicated between the tool shank and the interior of the barrel. Obviously the shank can rock on the common axis running through the two balls. Similarly, by reason of the approximately 7/1000ths of an inch clearance between the ball and the interior of the sleeve *d*, it will be apparent that a limited rocking effect can take place on an axis perpendicular to the axis common to the two balls. Each ball will simply retreat within its perforations the limit of this clearance, allowing the axis of the shank to assume a slightly angular relation with respect to the axis of the holder. This, as already explained, gives the tool a capacity for universal movement within a very small range to take care of any misalinement of the holder and the hole which is being counterbored.

It will be seen by comparing Figs. 3 and 4 that the balls are held in projected relation with respect to the recesses in the tool shank by rotating the knurled sleeve *d* within the limits allowed by the segmental slot *h* in the inner end of the sleeve which forms shoulders to abut against the stop screw *i*. To prevent the accidental turning of this sleeve after it has been set to keep the balls projected, as shown in Figs. 2 and 4, an expanding segmental spring *e* engages in the groove *g* of the knurled sleeve. This spring is compressed when the sleeve is fitted over and consequently exercises a frictional resistance to the turning movement of the sleeve. This is very nicely calculated to do the duty the sleeve has to perform. In turning to force the balls into the recesses of the tool shank, the sleeve turns comparatively easy as the direction of the turning rubs the spring the right way (the turning is clockwise in the showing of Fig. 5). In turning to release the balls, the sleeve turns counter-clockwise, as shown in Fig. 5, and consequently rubs the spring the wrong way and the turning is much harder. This is especially true with the contact at the point *x* where the sleeve contacts the curved-over end of the spring. This makes the initial resistance quite heavy so as to prevent accidental jarring loose. These are important features in a tool of this kind.

The expanding spring *e* also performs the very useful function of keeping the sleeve assembled upon the holder. It will be noted by comparing Figs. 2 and 5, that the spring under normal conditions rests on the division line between the sleeve and the holder and consequently ties the two together. This is due to the fact that the groove *g* in the sleeve has the capacity of only about half the diameter of the spring while the groove *f* in the barrel has the capacity of holding the entire spring. The stop screw *i* prevents the sleeve from being drawn off from the inner end of the holder, while the spring prevents it from being drawn off from the outer end of the holder. However, when the stop pin *i* is taken out, the sleeve may be drawn off from the inner end of the holder because the outer wall of the groove *g* is a sloping one so that when the sleeve is pulled hard this beveled wall forces the spring *e* entirely into the groove *f* of the barrel so that it can be drawn over the same. This allows the disassembly of the sleeve with respect to the barrel.

What I claim is:

1. In a tool holder, the combination of an open-ended barrel provided with a pair of balls movable in and out of perforations in the barrel, and a movable sleeve on the barrel having portions to hold the balls projected into the barrel and portions to allow the balls to retreat from the interior of the barrel, the said balls being arranged in a diametrically opposite position to allow the tool shank to pivot thereon and having sufficient clearance, when the shank is in place and the sleeve is turned to hold the balls projected to their limit toward the shank, to allow limited universal movement of the tool shank in the barrel.

2. A tool holder, comprising a barrel having an open end and provided with a pair of diametrically opposite perforations through the sides of the barrel, balls engaging in said perforations, a movable sleeve secured on the outside of the barrel and provided with recessed portions which can be moved into registry with the ball perforations to allow the retreat of the balls to the interior of the barrel, said balls serving to allow the tool to pivot on an axis common to the balls when the tool shank has a slight clearance in the barrel and said balls also having clearance in their sockets to allow the tool to rock on an axis perpendicular to the axis common to the two balls.

3. A tool holder, comprising a barrel provided with an open end, a plurality of ball openings in the side of the barrel, balls contained in said openings, and a partially rotatable sleeve secured on the outside of the barrel and adapted to be rotated to project the balls into the interior of the barrel or allow them to retreat from the interior of the barrel, and an expanding spring ring segment frictionally engaging the said sleeve to resist the sleeve accidentally turning from the position which holds the balls projected into the interior of the barrel.

4. A tool holder, comprising an open-ended barrel having ball openings in its side, a sleeve rotatable through a limited arc upon the outside of the barrel to hold the balls projected in the interior of the barrel or allow them to retreat from the interior of the barrel, and an expanding spring segment engaging between the sleeve and the barrel to frictionally resist turning movement of the sleeve and also to assemble the sleeve upon the barrel.

5. A tool holder, having in combination, an open-ended barrel provided with openings in its side, members contained in said openings, a sleeve rotatable through a limited arc upon said barrel to hold the members projected into the interior or allow them to retreat from the interior of the barrel, the said sleeve being provided with a groove having an abrupt wall on one side and a beveled wall on the other side, the said barrel provided with a ring groove and an expanding segment engaging between the barrel and the sleeve in the said groove of the sleeve and the ring groove of the barrel and capable of completely withdrawing into the said ring groove, said expanding segment preventing the sleeve from moving in the direction which brings the abrupt wall of the groove against the ring but allowing the sleeve to be moved in the opposite direction by reason of the beveled wall of the sleeve groove forcing the segment into the ring groove of the barrel, and a screw running into threads in the side of the barrel for preventing the sleeve from moving in its allowable direction until the screw is removed.

6. In a tool holder, the combination of an open-ended barrel provided with a pair of balls movable in and out of the perforations in the barrel, and a movable sleeve on the barrel arranged in one position to hold the balls projected into the barrel and in another position to allow the balls to retreat from the barrel, the said two balls being arranged in diametrically opposite position to allow the tool to pivot thereon and being slidable in the sockets to allow limited rocking movement of the tool on an axis perpendicular to the axis common to the two balls whereby the tool has a limited floating effect.

In testimony whereof I affix my signature.

GUSTAV C. SCHOENBORN.